T. O. MARTIN.
TOOL HOLDER.
APPLICATION FILED NOV. 30, 1920.
1,415,379.
Patented May 9, 1922.
2 SHEETS—SHEET 1.
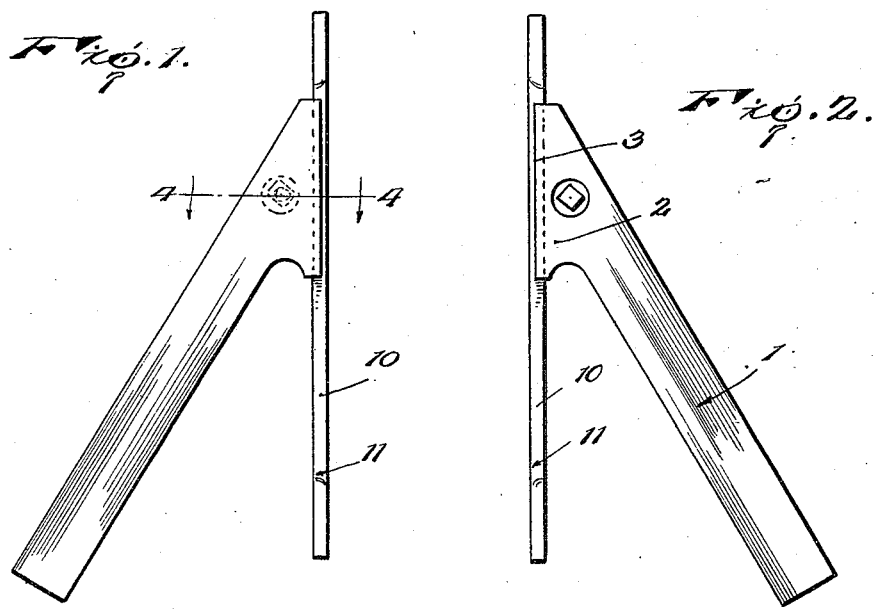
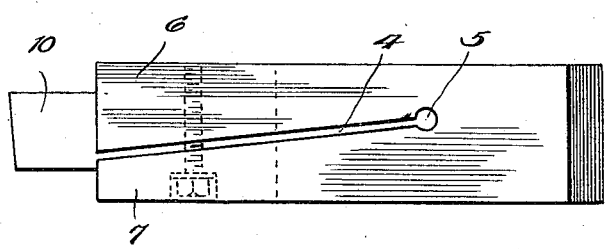
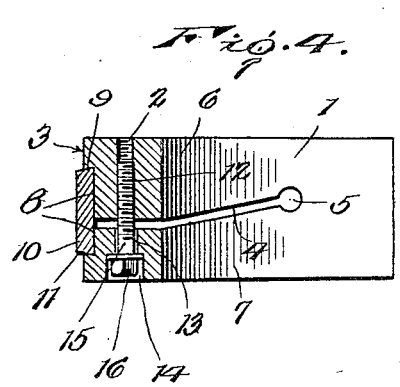
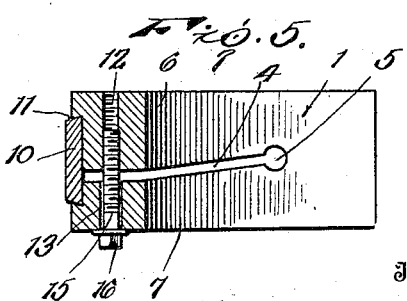
Inventor
T. O. Martin.
By Lacey & Lacey, Attorneys T. O. MARTIN.
TOOL HOLDER.
APPLICATION FILED NOV. 30, 1920.
1,415,379.
Patented May 9, 1922.
2 SHEETS—SHEET 2.
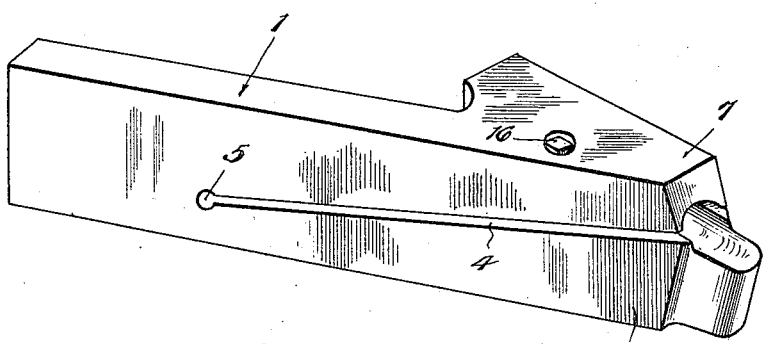
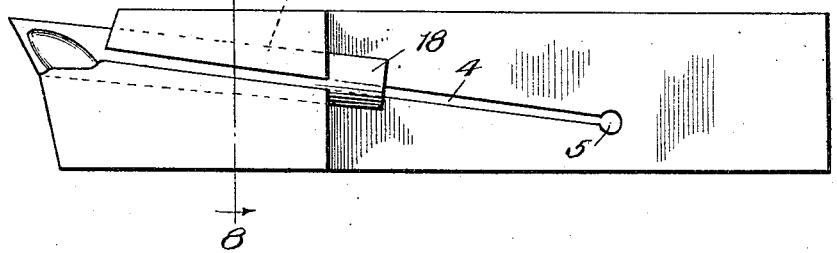
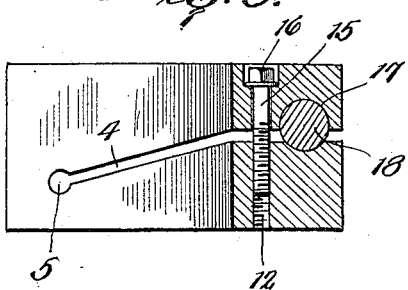
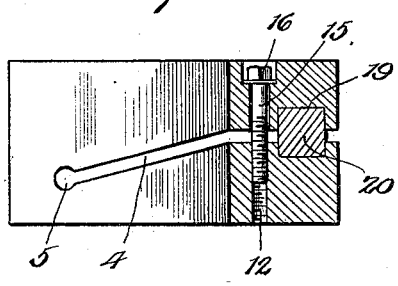
Inventor
T. O. Martin.
By
Lacey & Lacey, Attorneys

UNITED STATES PATENT OFFICE.

TREVILLIE O. MARTIN, OF JACKSON, TENNESSEE.

TOOL HOLDER.

1,415,379.  Specification of Letters Patent.  Patented May 9, 1922.

Application filed November 30, 1920. Serial No. 427,382.

*To all whom it may concern:*

Be it known that I, TREVILLIE O. MARTIN, a citizen of the United States, residing at Jackson, in the county of Madison and State of Tennessee, have invented certain new and useful Improvements in Tool Holders, of which the following is a specification.

This invention relates to improvements in machine tool holders and has as one of its objects to provide a tool holder more especially designed for the support of a tool in cutting off stock, and capable of being reversed so as to adapt the single holder for both right and left hand work.

Another object of the invention is to provide a tool holder adapted to support a tool at an oblique angle to the shank of the holder and formed to provide jaw portions possessing the desired degree of resiliency and therefore adapting them to securely clamp the tool to be held and prevent chattering of the tool or the holder during the cutting operation.

Another object of the invention is to so construct the holder that the same may be employed in supporting tools of various lengths, and, when required, tools which are comparatively short and which could not be conveniently supported in the usual manner, the invention contemplating also the utilization of broken or worn drill bits.

In the accompanying drawings:

Figure 1 is a top plan view of one form of the holder embodying the present invention positioned for right hand work;

Figure 2 is a similar view illustrating the holder reversed for use on left hand work;

Figure 3 is a side elevation of the holder shown in Figures 1 and 2 and disposed in the position shown in Figure 1;

Figure 4 is a vertical transverse sectional view on the line 4—4 of Figure 1 looking in the direction indicated by the arrows;

Figure 5 is a view similar to Figure 4 illustrating a modification of the clamping means;

Figure 6 is a perspective view illustrating a modified form of tool holder;

Figure 7 is a side elevation of the holder shown in Figure 6;

Figure 8 is a vertical transverse sectional view on the line 8—8 of Figure 7;

Figure 9 is a view similar to Figure 8 illustrating a modified form of the holder.

The tool holder illustrated in the first five figures of the drawings is designed to grip and support a tool which is in the nature of a substantially flat-sided blade whereas the holder illustrated in Figures 6 to 9 inclusive is designed to support a tool bit which is of round or polygonal shape in cross section, although in both forms of the invention the principle remains the same.

In the first five figures of the drawings the shank of the holder is indicated in general by the numeral 1 and is designed to be fitted into and clamped within the usual tool post and is preferably of rectangular cross sectional form as illustrated in these figures. At its outer end the shank 1 is formed with an integral nose 2 having a face 3 disposed at an oblique angle to the shank 1 and perpendicularly when the holder is in place within the tool post. In order to provide jaws for clamping the tool to be held and in order to impart to these jaws the desired degree of resiliency and adapt them to be drawn together so as to securely clamp the tool, the holder is formed with a slot which is indicated by the numeral 4 and which extends longitudinally of the nose 2 and shank 1 of the holder and opens through the side faces of these parts and also through the forward end of the nose, the slot being preferably furthermore disposed at an angle with relation to the longitudinal axis of the shank so that its inner end, indicated by the numeral 5, will terminate nearer one edge of the shank than the other. Thus for example in the construction illustrated in the drawings the inner end of the slot 4 terminates nearer the face of the shank which is uppermost when the holder is disposed in the position shown in Figures 1 and 3 of the drawings. However the slot might be extended in the reverse manner so as to terminate at its inner end nearer the opposite face of the shank but in any event inasmuch as it does terminate nearer one face than the other, the jaw at the corresponding side of the holder will be of increased resiliency due to the reduced thickness of the metal at its juncture with the shank of the holder. Preferably also the inner end of the slot 4 is enlarged and its wall at this end is of general cylindrical form so as to obviate the likelihood of splitting of the shank inwardly of the inner end of the slot upon excessive stresses being imposed upon the jaws. The jaws are indicated one by the numeral 6 and the other by the numeral 7, and, as will be readily understood, are separated by the slot 4, and of course the jaws extend from the tip of the nose 2 to the inner end of the slot 4. The face 3 of the nose is formed with recesses 8 which are relatively shallow and which have inwardly beveled walls 9 so that these recesses form in conjunction with each other a channel or seat to receive the tool which, in the present instance, is in the nature of a blade 10 having beveled upper and lower edges 11 designed to be engaged by and clamped between the walls 9 of the recesses 8, the beveling of these walls and the upper and lower edges of the blade providing for sliding adjustment of the blade or tool with relation to the nose 2 whereby its working end may be caused to project a greater or less distance beyond the tip of the nose of the holder.

In order that the jaws 6 and 7 may be brought together so as to clamp the tool, one of the jaws as for example the jaw 6 is formed in its nose portion 2 with a threaded socket 12 and the other jaw is formed with a bore 13 in alinement with said socket and the outer end of this bore is increased in diameter as at 14, a clamping bolt 15 is fitted through the bore 13 and threaded into the socket 12 and has a head 16 received within the enlarged end 14 of the bore 13 and bearing against the shoulder at the inner end of this enlargement. In this construction no portion of the clamping bolt projects beyond the surfaces of the tool holder which may be found of considerable advantage. However, if desired and as illustrated in Figure 5 of the drawings, the bore 13 may be formed of the same diameter throughout and the head of the bolt may be caused to bear against the edge face of the jaw 7.

The holder illustrated in Figures 6 to 9 inclusive is of the same construction as the holder above described and illustrated in Figures 1 to 5 inclusive and corresponding parts are indicated by like reference numerals. However this holder is adapted to support a tool bit which is of some shape other than flat sided as in the previous instance, and therefore to this end, the jaws 6 and 7 are formed somewhat thicker than in the previously described form of the invention and, in the form illustrated in Figures, 6, 7 and 8, are provided in their opposing faces with approximately semi-cylindrical channels 17 adapting them to clamp a tool bit 18 which is of substantially cylindrical form and which bit may comprise a broken or worn drill bit or a specially designed bit, either as desired. The structure shown in Figure 9 does not differ from that shown in Figures 6, 7 and 8 except that here the channels which are formed in the opposing faces of the jaws and which are indicated by the numeral 19, are of polygonal form thus adapting them to receive for example a square tool bit 20 as shown in the said Figure 9.

It will be observed that in the first described form of the invention the channel comprising the recesses 8 extends the entire length of the face 3 of the nose 2 of the holder and that in the last described form the channels in the opposing faces of the jaws 6 and 7 extend the entire length of these faces so that in both instances tool bits of various lengths may be gripped and securely held and suitably adjusted.

It will also be evident that the holder in both forms of the invention is adapted to be reversed in the tool post so as to present the tool held thereby for either right or left hand work.

The clamping bolt, it will be observed by reference to the drawings, is located in the line of the shank of the tool holder and therefore at the shank side of the nose 2 so that when the bolt is tightened the jaws will be evenly brought together.

Having thus described the invention, what is claimed as new is:

A tool holder comprising a shank provided with an obliquely disposed nose, the said holder being formed with a slot extending the entire length of the nose and for a portion of the length of the shank and dividing the nose into spaced jaw portions arranged to clamp between them a tool to be held, and clamping means for the jaws located substantially midway between the ends of the nose.

In testimony whereof I affix my signature.

TREVILLIE O. MARTIN. [L. S.]